(12) United States Patent
Yu et al.

(10) Patent No.: US 8,905,620 B2
(45) Date of Patent: Dec. 9, 2014

(54) BACKLIGHT MODULE

(71) Applicant: Shenzhen China Star Optoelectronics Technology Co., Ltd., Shenzhen, Guangdong (CN)

(72) Inventors: Gang Yu, Shenzhen (CN); Yubo Gu, Shenzhen (CN); Liuyang Yang, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 216 days.

(21) Appl. No.: 13/704,230

(22) PCT Filed: Oct. 26, 2012

(86) PCT No.: PCT/CN2012/083525
§ 371 (c)(1),
(2), (4) Date: Dec. 13, 2012

(87) PCT Pub. No.: WO2014/056263
PCT Pub. Date: Apr. 17, 2014

(65) Prior Publication Data
US 2014/0104886 A1 Apr. 17, 2014

(30) Foreign Application Priority Data
Oct. 12, 2012 (CN) .......................... 2012 1 0387484

(51) Int. Cl.
F21V 7/04 (2006.01)
F21V 15/01 (2006.01)

(52) U.S. Cl.
CPC ..................................... F21V 15/01 (2013.01)
USPC ......................................... 362/633; 362/615

(58) Field of Classification Search
USPC .................... 362/615, 633, 97.1, 217.11, 362
See application file for complete search history.

(56) References Cited

U.S. PATENT DOCUMENTS

2012/0236541 A1 9/2012 Chen

FOREIGN PATENT DOCUMENTS

| CN | 101726917 A | 6/2010 |
|---|---|---|
| CN | 201606759 U | 10/2010 |
| CN | 201740943 U | 2/2011 |
| CN | 102032512 A | 4/2011 |
| CN | 102081881 A | 6/2011 |
| CN | 201983111 U | 9/2011 |
| CN | 202057922 U | 11/2011 |
| CN | 202371588 U | 8/2012 |

Primary Examiner — Vip Patel
(74) Attorney, Agent, or Firm — Andrew C. Cheng

(57) ABSTRACT

The present invention provides a backlight module, which includes a backplane, a backlight source arranged inside the backplane, a reflector plate arranged inside the backplane, a light guide plate arranged on the reflector plate, and a mold frame mounted to the backplane. The backplane forms a pawl section. The mold frame forms a retention slot corresponding to the pawl section. The pawl section is receivable in and retained by the retention slot so as to fix the mold frame to the backplane. The backlight module uses a pawl section formed on the backplane and a retention slot formed on the mold frame to engage the pawl section so as to mount the mold frame to the backplane through snap-fitting connection thereby showing a simple structure, being easy to assemble and disassemble, effectively saving time, and thus controlling the cost.

9 Claims, 1 Drawing Sheet

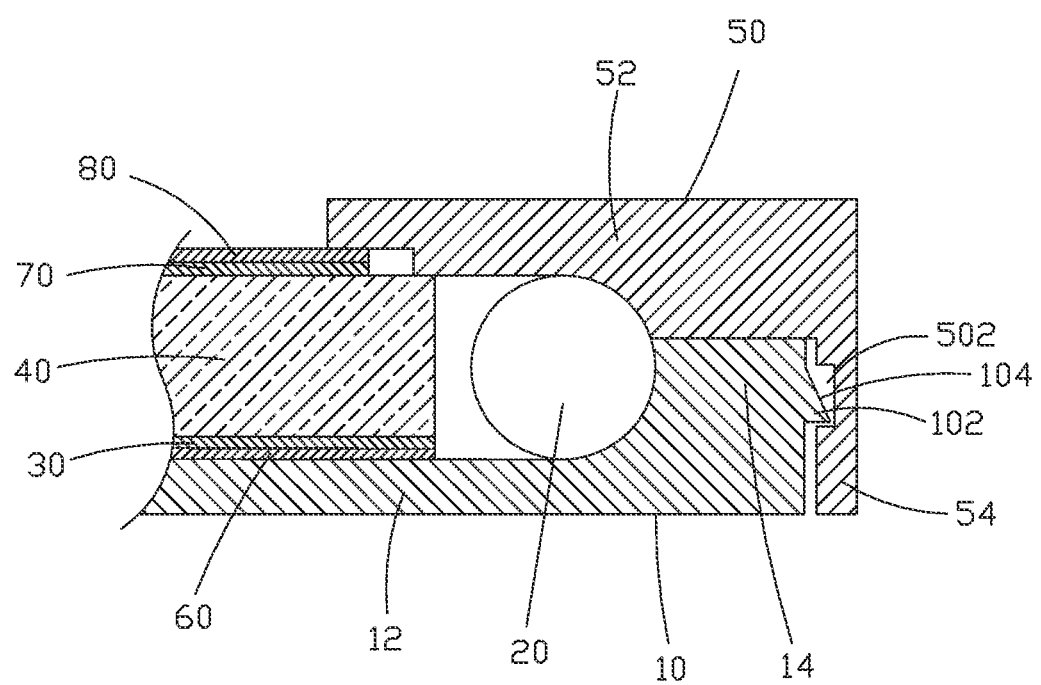

BACKLIGHT MODULE

BACKGROUND OF THE INVENTION

1. Field of the Invention

The present invention relates to the field of liquid crystal displaying, and in particular to a backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel glass substrates and a plurality of vertical and horizontal fine electrical wires are arranged between the two glass substrates, whereby the liquid crystal molecules are controlled to change direction by application of electricity in order to refract light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The direct backlight module comprises a light source, such as a cold cathode fluorescent lamp (CCFL) or a light-emitting diode (LED), which is arranged at the back side of the liquid crystal panel to form a planar light source that directly provides lighting to the liquid crystal panel. The side-edge backlight module comprises a backlight source of LED light bar arranged at an edge of a backplane to be located rearward of one side of the liquid crystal panel. The LED light bar emits light that enters a light guide plate (LGP) through a light incident face of the light guide plate and is projected out through a light emergence face of the light guide plate, after being reflected and diffused, to thereby transmit through an optic film assembly and form a planar light source for the liquid crystal panel.

A conventional side-edge backlight module comprises a backplane, a backlight source arranged inside the backplane, a reflector plate arranged inside the backplane, a light guide plate arranged above the reflector plate, an optic film assembly arranged on the light guide plate, and a mold frame mounted to the backplane. The backplane and the mold frame are often fixed together through bolts. Such a process of assembling requires the use of a separate tool so that assembling and disassembling are both difficult and consume work hours.

SUMMARY OF THE INVENTION

An object of the present invention is to provide a backlight module, which comprises a backplane and a mold frame that are assembled and fixed together through snap-fitting connection, showing a simple structure and being easy to assemble and disassemble.

To achieve the object, the present invention provides a backlight module, which comprises a backplane, a backlight source arranged inside the backplane, a reflector plate arranged inside the backplane, a light guide plate arranged on the reflector plate, and a mold frame mounted to the backplane. The backplane forms a pawl section. The mold frame forms a retention slot corresponding to the pawl section. The pawl section is receivable in and retained by the retention slot so as to fix the mold frame to the backplane.

The backplane comprises a bottom board and a first side board connected to the bottom board.

The pawl section is formed on the first side board.

The pawl section is formed to extend downward in an inclined manner from an outside surface of the first side board at a location adjacent to a free end thereof and has an inclined face. The inclined face is arranged to face toward the retention slot.

The mold frame comprises a top board and a second side board connected to the top board.

The retention slot is formed in the second side board.

The backlight module further comprises a heat dissipation plate arranged under the reflector plate, a diffusion plate arranged on the light guide plate, and a prism plate arranged on the diffusion plate.

The e backlight source comprises a linear light source.

The present invention also provides a backlight module, which comprises a backplane, a backlight source arranged inside the backplane, a reflector plate arranged inside the backplane, a light guide plate arranged on the reflector plate, and a mold frame mounted to the backplane, the backplane forming a pawl section, the mold frame forming a retention slot corresponding to the pawl section, the pawl section being receivable in and retained by the retention slot so as to fix the mold frame to the backplane;

wherein the backplane comprises a bottom board and a first side board connected to the bottom board;

wherein the pawl section is formed on the first side board;

wherein the pawl section is formed to extend downward in an inclined manner from an outside surface of the first side board at a location adjacent to a free end thereof and has an inclined face, the inclined face being arranged to face toward the retention slot;

wherein the mold frame comprises a top board and a second side board connected to the top board;

wherein the retention slot is formed in the second side board;

further comprising a heat dissipation plate arranged under the reflector plate, a diffusion plate arranged on the light guide plate, and a prism plate arranged on the diffusion plate; and wherein the backlight source comprises a linear light source.

The efficacy of the present invention is that the present invention provides a backlight module, which comprises a backplane forming a pawl section and a mold frame forming a retention slot engageable with the pawl section so that the mold frame is mountable to the backplane through snap-fitting connection thereby showing a simple structure, being easy to assemble and disassemble, effectively saving time, and thus controlling the cost.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of an embodiment of the present invention, with reference to the attached drawing. In the drawing:

FIG. 1 is a schematic view showing the structure of a backlight module of the present invention.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Referring to FIG. 1, the present invention provides a backlight module, which comprises a backplane 10, a backlight source 20 arranged inside the backplane 10, a reflector plate 30 arranged inside the backplane 10, a light guide plate 40 arranged on the reflector plate 30, and a mold frame 50 mounted to the backplane 10.

The backplane 10 forms a pawl section 102. The mold frame 50 forms a retention slot 502 corresponding to the pawl section 102. The pawl section 102 is received in and retained by the retention slot 502 so as to fix the mold frame 50 to the backplane 10. The backplane 10 comprises a bottom board 12 and a first side board 14. The pawl section 102 is formed on the first side board 14. The mold frame 50 comprises a top board 52 and a second side board 54. The retention slot 502 is formed in the second side board 54. In the instant embodiment, the pawl section 102 is formed to extend downward in an inclined manner from an outside surface of the first side board 14 at a location adjacent to a free end thereof and has an inclined face 104. The inclined face 104 is arranged to face toward the retention slot 502. To assemble, the mold frame 50 is directly pressed down toward the backplane 10 to have the pawl section 102 sliding into the retention slot 502. The process of mounting is simple and time can be saved. To disassemble, a free end of the second side board 54 of the mold frame 50 is deflected outward, and at the same time, the mold frame 50 is lifted upward to allow the pawl section 102 to slide off the retention slot 502 thereby separating the mold frame 50 and the backplane 10 from each other. The processing of disassembling is simple and time can be saved.

The backlight module according to the present invention also comprises a heat dissipation plate 60 arranged under the reflector plate 30, a diffusion plate 70 arranged on the light guide plate 40, and a prism plate 80 arranged on the diffusion plate 70. The backlight source 20 comprises a linear light source, which emits light of which a portion directly transmits through an incidence surface of the light guide plate 40 to enter the interior of the light guide plate 40 and a remaining portion is reflected by the reflector plate 30 to get into the light guide plate 40. The light propagates through the light guide plate 40 as being simultaneously subjected to total reflection and refraction and is further subjected to diffusion through the diffusion plate 70 and the prism plate 80 to thereby provide a uniformly distributed planar light source.

In summary, the present invention provides a backlight module, which comprises a backplane forming a pawl section and a mold frame forming a retention slot engageable with the pawl section so that the mold frame is mountable to the backplane through snap-fitting connection thereby showing a simple structure, being easy to assemble and disassemble, effectively saving time, and thus controlling the cost.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising a backplane, a backlight source arranged inside the backplane, a reflector plate arranged inside the backplane, a light guide plate arranged on the reflector plate, and a mold frame mounted to the backplane, the backplane forming a pawl section, the mold frame forming a retention slot corresponding to the pawl section, the pawl section being receivable in and retained by the retention slot so as to fix the mold frame to the backplane.

2. The backlight module as claimed in claim 1, wherein the backplane comprises a bottom board and a first side board connected to the bottom board.

3. The backlight module as claimed in claim 2, wherein the pawl section is formed on the first side board.

4. The backlight module as claimed in claim 3, wherein the pawl section is formed to extend downward in an inclined manner from an outside surface of the first side board at a location adjacent to a free end thereof and has an inclined face, the inclined face being arranged to face toward the retention slot.

5. The backlight module as claimed in claim 1, wherein the mold frame comprises a top board and a second side board connected to the top board.

6. The backlight module as claimed in claim 5, wherein the retention slot is formed in the second side board.

7. The backlight module as claimed in claim 1 further comprising a heat dissipation plate arranged under the reflector plate, a diffusion plate arranged on the light guide plate, and a prism plate arranged on the diffusion plate.

8. The backlight module as claimed in claim 1, wherein the backlight source comprises a linear light source.

9. A backlight module, comprising a backplane, a backlight source arranged inside the backplane, a reflector plate arranged inside the backplane, a light guide plate arranged on the reflector plate, and a mold frame mounted to the backplane, the backplane forming a pawl section, the mold frame forming a retention slot corresponding to the pawl section, the pawl section being receivable in and retained by the retention slot so as to fix the mold frame to the backplane;
   wherein the backplane comprises a bottom board and a first side board connected to the bottom board;
   wherein the pawl section is formed on the first side board;
   wherein the pawl section is formed to extend downward in an inclined manner from an outside surface of the first side board at a location adjacent to a free end thereof and has an inclined face, the inclined face being arranged to face toward the retention slot;
   wherein the mold frame comprises a top board and a second side board connected to the top board;
   wherein the retention slot is formed in the second side board;
   further comprising a heat dissipation plate arranged under the reflector plate, a diffusion plate arranged on the light guide plate, and a prism plate arranged on the diffusion plate; and
   wherein the backlight source comprises a linear light source.

* * * * *